United States Patent
Katch et al.

(10) Patent No.: US 7,132,811 B2
(45) Date of Patent: Nov. 7, 2006

(54) VEHICLE SPEED DEPENDENT COMPENSATOR FOR ELECTRIC STEERING SYSTEMS

(75) Inventors: Gregory Katch, Linden, MI (US); William Wittig, Saginaw, MI (US); Kathryn Pattok, Frankenmuth, MI (US); Julie Kleinau, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/390,330

(22) Filed: Mar. 27, 2006

(65) Prior Publication Data

US 2006/0175998 A1    Aug. 10, 2006

Related U.S. Application Data

(63) Continuation of application No. 10/807,752, filed on Mar. 23, 2004, now abandoned.

(60) Provisional application No. 60/458,701, filed on Mar. 28, 2003.

(51) Int. Cl.
*H02P 7/00* (2006.01)

(52) U.S. Cl. ............... 318/432; 318/434; 323/274; 323/284

(58) Field of Classification Search ............ 318/432, 318/434; 323/274, 284
See application file for complete search history.

(56) References Cited

U.S. PATENT DOCUMENTS

| | | | | |
|---|---|---|---|---|
| 5,668,721 A | * | 9/1997 | Chandy | 180/446 |
| 5,668,722 A | * | 9/1997 | Kaufmann et al. | 701/41 |
| 5,704,446 A | * | 1/1998 | Chandy et al. | 180/446 |
| 5,719,766 A | * | 2/1998 | Bolourchi et al. | 701/42 |
| 5,998,952 A | * | 12/1999 | McLaughlin et al. | 318/432 |
| 6,122,579 A | * | 9/2000 | Collier-Hallman et al. | 701/41 |
| 2004/0162655 A1 | * | 8/2004 | Patankar | 701/41 |

* cited by examiner

*Primary Examiner*—Rita Leykin
(74) *Attorney, Agent, or Firm*—Michael D. Smith

(57) ABSTRACT

An electric power steering control system comprising: an electric motor disposed in a vehicle to apply torque to a steerable wheel; a torque sensor disposed in the vehicle for detecting a steering wheel torque and generating a torque signal indicative thereof; a vehicle speed sensor, the vehicle speed sensor generating a vehicle speed signal; a controller coupled to the torque sensor, the vehicle speed sensor and the electric motor. The controller generates a scheduled compensated torque command to the electric motor. The scheduled compensated torque command is based on at least one of: a torque command signal responsive to the torque signal; a compensated torque command signal; and a blend of the torque command signal and the compensated torque command signal. At least one of the torque command signal, the compensated torque command signal and the blend is based the vehicle speed signal.

20 Claims, 2 Drawing Sheets

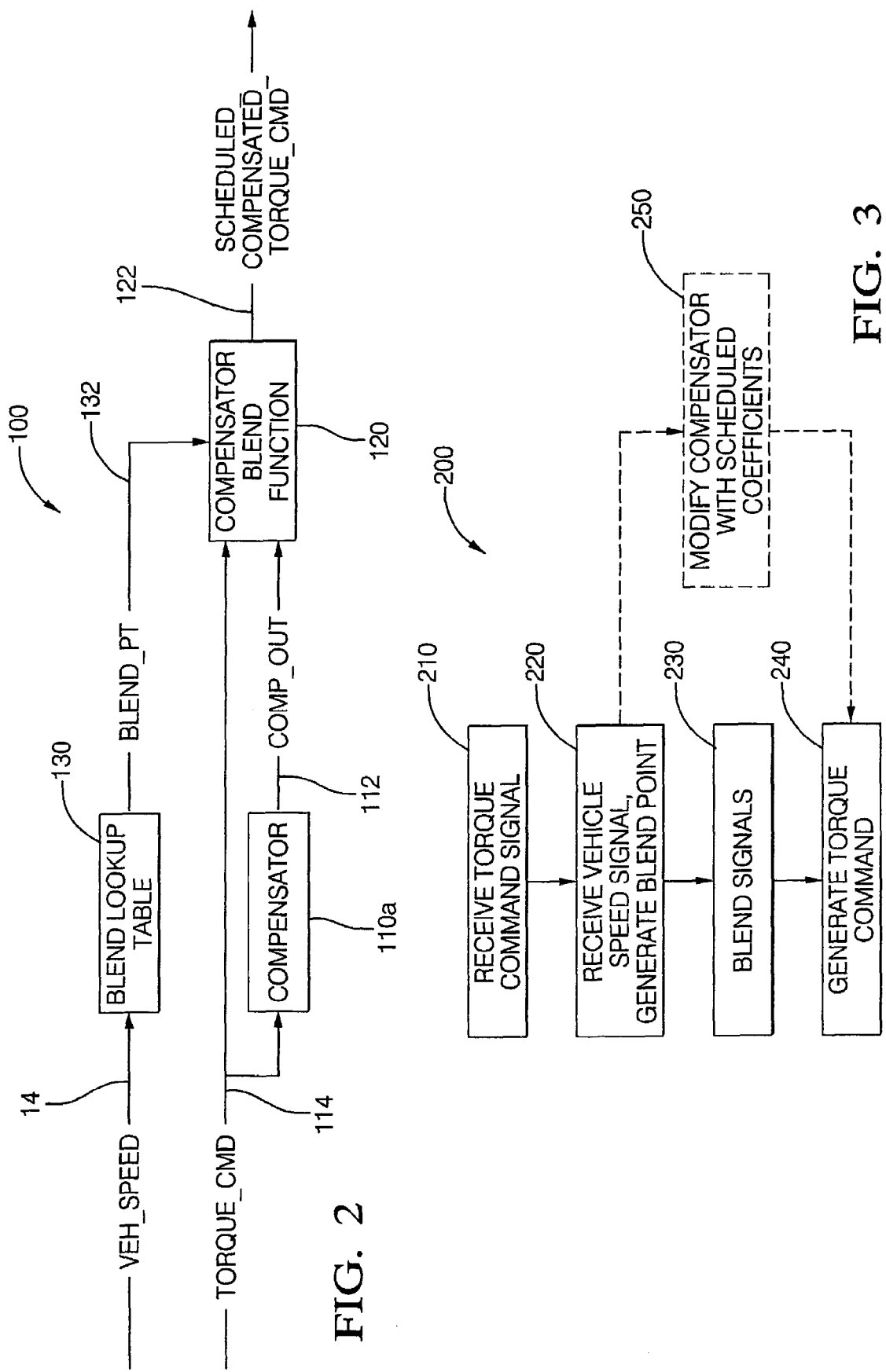

VEHICLE SPEED DEPENDENT COMPENSATOR FOR ELECTRIC STEERING SYSTEMS

CROSS-REFERENCE TO RELATED APPLICATIONS

This application is a continuation of U.S. Ser. No. 10/807,752, filed on Mar. 23, 2004.

This application further claims the benefit of United States provisional application No. 60/458,701 filed Mar. 28, 2003 the contents of which are incorporated by reference herein in their entirety.

BACKGROUND

Existing compensation structures for Electric Power Steering (EPS) systems often use torque loop compensation for an electric motor control system. In such existing EPS systems, a torque compensator, commonly a notch filter, is employed in the torque path to provide phase lead to ensure that the system remains stable. However, application of a torque compensator may make the EPS system sensitive to disturbances that include frequency content near the notch frequency. The compensator may also cause the on-center feel (torque gradient) to feel less precise.

While well suited for its intended purposes, the torque compensator may not provide desired characteristics under all operating conditions. For example, such a system may not provide desired characteristics under all vehicle speed conditions. With the aforementioned considerations, it may be difficult to apply torque compensation in some vehicles and tune the control system to achieve acceptable performance. Therefore, what is needed is a method for modifying the compensation utilized as a function of vehicle operating parameters.

SUMMARY

Disclosed herein, in an exemplary embodiment, is an electric power steering control system comprising: an electric motor disposed in a vehicle to apply torque to a steerable wheel; a vehicle speed sensor, the vehicle speed sensor generating a vehicle speed signal; a controller coupled to the vehicle speed sensor and the electric motor. The controller generates a scheduled compensated torque command to the electric motor. The scheduled compensated torque command is based on at least one of: a torque command signal; a compensated torque command signal; and a blend of the torque command signal and the compensated torque command signal. At least one of the torque command signal, the compensated torque command signal and the blend is based on the vehicle speed signal.

Also disclosed herein, in another exemplary embodiment, is a method of controlling an electric power steering system, the method comprising: receiving a torque command signal; receiving a vehicle speed signal responsive to a speed of a vehicle; and generating a scheduled compensated torque command. The scheduled compensated torque command is based on at least one of: the torque command signal, a compensated torque command signal, and a blend of the torque command signal and the compensated torque command signal. At least one of the torque command signal, the compensated torque command signal and the blend is based on the vehicle speed signal.

Further disclosed herein, in yet another exemplary embodiment, is a electric power steering control system comprising: a means for applying torque to a steerable wheel; a means for detecting a vehicle speed and generating a speed signal indicative thereof; a means for receiving the vehicle speed signal; and a means for generating a scheduled compensated torque command. The scheduled compensated torque command is based on at least one of: a torque command signal; a compensated torque command signal; and a blend of the torque command signal and the compensated torque command signal. At least one of the torque command signal, the compensated torque command signal and the blend is based on the vehicle speed signal.

Also disclosed herein is a storage medium encoded with a machine-readable computer program code for controlling an electric power steering system, the storage medium including instructions for causing controller to implement the disclosed method.

Further disclosed is a computer data signal embodied in a carrier wave for controlling an electric power steering system, the data signal comprising code configured to cause a controller to implement the disclosed method.

BRIEF DESCRIPTION OF THE DRAWINGS

The present invention will now be described, by way of an example, with references to the accompanying drawings, wherein like elements are numbered alike in the several figures in which:

FIG. 2 depicts a partial simplified block diagram of a torque control architecture in accordance with an exemplary embodiment; and FIG. 3 depicts a flowchart of an illustrative methodology in accordance with an exemplary embodiment.

DETAILED DESCRIPTION OF AN EXEMPLARY EMBODIMENT

Figure 1:
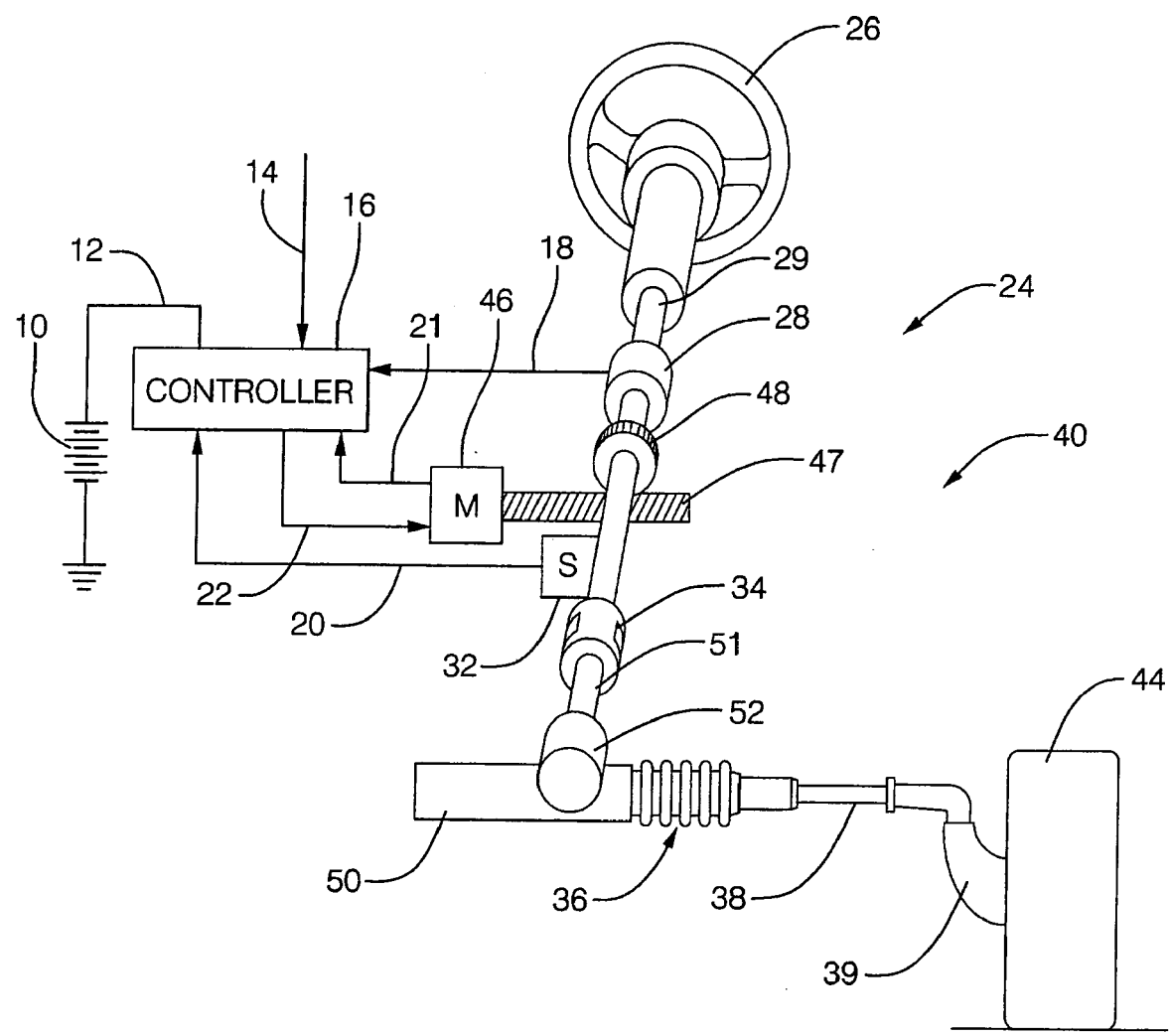
FIG. 1 depicts a vehicle control system for electronic steering.

Electric power systems often employ a torque compensator, commonly a notch filter, in the torque path to provide phase lead to ensure that the system remains stable. It should be appreciated that deeper notch filters (e.g., those exhibiting more gain reduction at the notch frequency) while providing necessary stability often degrade the disturbance rejection properties of the system at the notch frequency. Further, it should be recognized that a closed loop system cannot reject disturbances where the gain is very low, as it is at the notch center frequency. Additionally, notch filters may also affect the closed loop response of the system (e.g., input impedance) if their gain and phase characteristics intrude on the frequency range of operator inputs. The ill effects of the low frequency sensitivity are transmitted to and felt by the driver in the form of disturbances caused by friction in mechanical parts. It should also be evident therefore, that a compensator with a given frequency characteristics cannot always address disturbance rejection considerations while maintaining control system stability.

An exemplary embodiment of the invention, by way of illustration, is described herein and may be applied to a torque control system for an electric motor in a vehicle steering system. While a preferred embodiment is shown and described, it will be appreciated by those skilled in the art that the invention is not limited to the embodiment described herein, but also to any control system employing an electric machine with torque compensation.

Referring to FIG. 1, reference numeral 40 generally designates a motor vehicle electric power steering system suitable for implementation of the disclosed embodiments. The steering mechanism 36 is a rack-and-pinion type system and includes a toothed rack (not shown) within housing 50 and a pinion gear (also not shown) located under gear housing 52. As the steering wheel 26 is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and the electric motor 46. The controller 16 is powered by the vehicle power supply 10 through line 12. The controller 16 receives a vehicle speed signal 14 representative of the vehicle speed. Steering pinion gear angle is measured through position sensor 32, which may be an optical encoding type sensor, variable resistance type sensor, or any other suitable type of position sensor, and supplies to the controller 16 a position signal 20. Motor velocity may be measured with a tachometer and transmitted to controller 16 as a motor velocity signal 21. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is the preferable torque sensor, any other suitable torque-sensing device used with known signal processing techniques will suffice.

In response to the various inputs, the controller 16 sends a command 22 to the electric motor 46, which supplies torque assist to the steering system through worm 47 and worm gear 48, providing torque assist to the vehicle steering.

In order to perform the prescribed functions and desired processing, as well as the computations therefore (e.g., the execution of motor control algorithm(s), the control processes prescribed herein, and the like), controller 16 may include, but not be limited to, a processor(s), computer(s), memory, storage, register(s), timing, interrupt(s), communication interfaces, and input/output signal interfaces, as well as combinations comprising at least one of the foregoing. For example, controller 16 may include input signal filtering to enable accurate sampling and conversion or acquisitions of such signals from communications interfaces. Additional features of controller 16 and certain processes therein are thoroughly discussed at a later point herein.

FIG. 2 depicts a partial simplified block diagram of a torque control architecture as may be implemented in controller 16 for controlling the motor 46 including the blending processes 100 of an exemplary embodiment. In an exemplary embodiment the torque command of control system 24 is modified by a blending function 120. In other words, the compensator 110 of existing configurations is replaced by a compensator 110a and blending function 120 of an exemplary embodiment. In an exemplary embodiment the blending function 120 provides as an output, denoted herein as scheduled compensated torque command 122, a blend of the compensated torque command 112, and the torque command 114.

The blending function 120 is responsive to a vehicle speed based blend scheduling 132 also denoted Blend_PT in the figure. In an implementation of an exemplary embodiment the speed based blend scheduling 132 is based on blend look-up table 130 responsive to the vehicle speed 14. In an exemplary embodiment the speed based blend scheduling 132 is configured as a two state multiplier with a range of zero percent to 100 percent. Namely, if the vehicle speed 14 is less than or equal to a first selected threshold, then the speed based blend scheduling 132 is set to 100 percent. For vehicle speeds 14 greater than or equal to a second selected threshold, then the speed based blend scheduling 132 is set to 0 percent. Finally, for vehicle speeds 14 greater than the first selected threshold and less than the second selected threshold, then the speed based blend scheduling 132 smoothly transitions from 100 percent to 0 percent. It will be appreciated that while in an exemplary embodiment a look-up table is disclosed, any form of scheduling for the vehicle speed 14 is possible. It will also be appreciated that the form of transitioning from one value to another for the speed based blend scheduling 132 may include, but not be limited to, switched, nonlinear, a linear ramp, polynomial and the like, as well as combinations thereof.

Continuing now with FIG. 2 and moving to the compensator blend function 120, in an exemplary embodiment, the output of the blending function is as follows:

$$\text{Scheduled\_Comp\_}Tq_{CMD} = (\text{COMP\_OUT} * \text{BLEND\_}PT) + (\text{Torque}_{CMD}) * (100\% - \text{BLEND\_}PT))$$

In one implementation of an exemplary embodiment a simple blending is employed. It will be appreciated that the speed based blend scheduling 132 or in this instance the Blend Point (BLEND_PT) could also be a function of one or more threshold conditions. For example, a selected compensation or blend of compensations for vehicle speeds 14 below a first selected threshold, a second compensation or second blend of compensations for speeds greater than or equal to the first selected threshold and yet less than or equal to a second selected threshold, and finally, yet another compensation or blend of compensations for vehicle speeds 14 above the second selected threshold.

Similarly, in yet another alternative embodiment, additional thresholds are employed with multiple blends of compensations being employed for a variety of ranges of vehicle speed. Moreover, it will be appreciated that the blending function may very well be a function of yet another variable. In an exemplary embodiment, the torque compensation at compensator 110a is blended as a function of vehicle speed 14, however, it will be appreciated that other parameters may readily be employed to modify or schedule the blending disclosed herein. Additionally, while multiple blends may utilized, likewise, multiple compensators 110a may be employed. For example, one or more compensators with the outputs therefrom being blended to formulate the final torque command.

Moreover, in yet another exemplary embodiment, it will be appreciated that a simple switching function may also be employed to facilitate the blend function. It should readily be appreciated that variations of the blending function with respect to a particular implementation may readily be employed without deviating from the scope and breadth of the claims.

Finally, in yet another alternative embodiment, the compensator 110a may readily be integrated with the blend function 120 and the coefficents of the filter(s) of the compensator 110a may directly be scheduled based on the speed based blend scheduling 132 or in this instance the Blend Point (BLEND_PT) and thereby, vehicle speed 14. The compensator 110$a$ may include a scaling and/or one or more frequency based filter(s) configured to manipulate the spectral characteristics of the torque command 114. Manipulation of the coefficients of the compensator 110$a$ facilitates closed loop torque control to ensure stability and characterization of steering system response. Moreover, one skilled in the art will appreciate that in any instance of blending or manipulating of the filter characteristics for compensator 110$a$ considerations of filter characteristics, dynamics and overall system (control loop) characteristics should be addressed to ensure acceptable performance over the desired operating range.

Additionally, while a look-up table and filter are disclosed for generation of speed based blend scheduling 132 and compensation respectively, it will be appreciated that other configurations are possible. For example, the blend look-up table 130, could be configured as gains, scaling, multipliers, schedulers, and the like, which may be configured to be dynamic and may also be the function of other parameters. Similarly, other filters and filter orders and topologies are possible for the compensator 110$a$. Moreover, it may be desirable to employ varied filter topologies based upon different conditions, system dynamic conditions and considerations, sensor characteristics, implementation constraints, and the like, as well as combinations of the foregoing. For example it may be desireable to employ a higher order filter to ensure that a wide variety of dynamic conditions may be addressed or to address implementation constraints such as commonality of filter topologies or to enable varied filter types in a single topology.

Turning now to FIG. 3, an illustrative flowchart of an exemplary methodology 200 is depicted. At process block 210, a torque command signal is received. The torque command signal may be indicative of the desired assist torque in the steering system 40. At process block 220, a vehicle speed signal is received. The vehicle speed is indicative the speed of the vehicle. At process block 230, a blended torque is fomulated with one or more compensated torque command signals e.g., 112 and the torque command signal e.g. 114, and finally at block 240 the scheduled compensated torque command 122 to the motor 46 is generated. As stated earlier, the scheduled compensated torque command 122 is based on at least one of the torque command signal, a compensated torque command signal, and a blend of the torque command signal and the compensated torque signal. Continuing with FIG. 3, at process block 250 the optional process of a modified compensator 110$a$ with schedulable coefficients is depicted. The resultant of the modified compensator 110$a$ with scheduling is utilized to generate the scheduled compensated torque command 122 to the motor 46.

It is important to note that all the examples provided herein relate to a vehicle having steerable wheels. However, it should be understood that the embodiments disclosed herein may readily be extended to a vehicle with any number of wheels to be steered. Moreover, it will be appreciated that the use of first and second or other similar nomenclature for denoting similar items is not intended to specify or imply any particular order unless otherwise stated.

The disclosed method may be embodied in the form of computer-implemented processes and apparatuses for practicing those processes. The method can also be embodied in the form of computer program code containing instructions embodied in tangible media, such as floppy diskettes, CD-ROMs, hard drives, or any other computer-readable storage medium 13, wherein, when the computer program code is loaded into and executed by a computer, e.g. controller 16, the computer becomes an apparatus capable of executing the method. The present method can also be embodied in the form of computer program code, for example, whether stored in a storage medium 13, loaded into and/or executed by a computer, or as data signal 15 transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus capable of executing the method. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electric power steering system, comprising:
   an electric motor disposed in a vehicle to apply torque to a steerable wheel;
   a vehicle speed sensor generating a vehicle speed signal indicative of a vehicle speed;
   a controller coupled to the vehicle speed sensor and the electric motor, the controller utilizing a compensator filter to determine a compensated torque command based on a torque command, the controller utilizing a blend function to determine a blending value based on the vehicle speed signal, the controller determining a weighted average of the torque command and the compensated torque command to obtain a scheduled compensated torque command, the weighted average being further determined by the blending value, the controller controlling an output torque of the electric motor based on the scheduled compensated torque command.

2. The system of claim 1, wherein the blend function comprises a look-up table having blending values associated with vehicle speed values.

3. The system of claim 1, wherein the torque command is indicative of a desired assist torque for the electric power steering system.

4. The system of claim 1, wherein the scheduled compensated torque command is configured to facilitate characterization of at least one of an electric power steering system stability, a torque disturbance rejection, and an input impedance.

5. The system of claim 1, wherein the scheduled compensated torque command is configured to characterize on-center feel of the electric power steering system.

6. The system of claim 1, wherein the scheduled compensated torque command is equal to the compensated torque command when the vehicle speed is less than or equal to a first threshold speed, the scheduled compensated torque command being equal to the torque command when the vehicle speed is greater than or equal to a second threshold speed, the second threshold speed being greater than the first threshold speed, the scheduled compensated torque command being equal to a first value that is calculated utilizing the torque command, the compensated torque command, and the blending value when the vehicle speed is greater than the first threshold speed and less than the second threshold speed.

7. A method of controlling an electric power steering system, comprising:
receiving a torque command;
receiving a vehicle speed signal responsive to a speed of a vehicle;
determining a compensated torque command based on the torque command, utilizing a compensator filter;
determining a blending value based on the vehicle speed signal utilizing a blend function;
determining a weighted average of the torque command and the compensated torque command to obtain a scheduled compensated torque command, the weighted average being further determined by the blending value; and
controlling an output torque of the electric motor based on the scheduled compensated torque command.

8. The method of claim 7, wherein the blend function comprises a look-up table having blending values associated with vehicle speed values.

9. The method of claim 7, wherein the torque command is indicative of a desired assist torque for the electric power steering system.

10. The method of claim 7, wherein the scheduled compensated torque command is configured to facilitate characterization of at least one of an electric power system stability, a torque disturbance rejection, and an input impedance.

11. The method of claim 7, wherein the scheduled compensated torque command is configured to characterize on-center feel of the electric power steering system.

12. An electric power steering system, comprising:
an electric motor disposed in a vehicle to apply torque to a steerable wheel;
a vehicle speed sensor generating a vehicle speed signal indicative of a vehicle speed; and
a controller coupled to the vehicle speed sensor and the electric motor, the controller utilizing a compensator filter to determine a compensated torque command based on a torque command wherein coefficients of the compensator filter are functions of the vehicle speed, the controller controlling an output torque of the electric motor based on the compensated torque command.

13. A method of controlling an electric power steering system, the method comprising:
receiving a torque command;
receiving a vehicle speed signal indicative of a vehicle speed;
determining a compensated torque command based on the torque command utilizing a compensator filter, wherein coefficients of the compensator filter are functions of the vehicle speed; and
controlling an output torque of the electric motor based on the compensated torque command.

14. An electric power steering system, comprising:
an electric motor disposed in a vehicle to apply torque to a steerable wheel;
a vehicle speed sensor generating a vehicle speed signal; and
a controller coupled to the vehicle speed sensor and the electric motor, the controller generating a compensated torque command utilizing a compensator function based on a torque command signal, the controller further generating a scheduled compensated torque command for the electric motor utilizing a blending function, the blending function outputting the scheduled compensated torque command equal to the compensated torque command signal when the vehicle speed signal indicates a vehicle speed is less than or equal to a first threshold speed, the blending function outputting the scheduled compensated torque command equal to the torque command signal when the vehicle speed signal indicates the vehicle speed is greater than or equal to a second threshold speed, the second threshold speed being greater than the first threshold speed, the blending function outputting the scheduled compensated torque command equal to a first value that is calculated utilizing the torque command signal, the compensated torque command signal, and a blend scheduling signal when the vehicle speed signal indicates the vehicle speed is greater than the first threshold speed and less than the second threshold speed.

15. The system of claim 14, wherein the blend scheduling signal is based on a look-up table responsive to the vehicle speed signal.

16. The system of claim 14, wherein the torque command signal is based on a torque signal and is indicative of a desired assist torque for the steering system.

17. A method of controlling an electric power steering system, the method comprising:
receiving a torque command signal;
receiving a vehicle speed signal responsive to a speed of a vehicle;
generating a compensated torque command signal utilizing a compensator function based on a torque command signal; and
generating a scheduled compensated torque command for the electric motor utilizing a blending function, the blending function outputting the scheduled compensated torque command equal to the compensated torque command signal when the vehicle speed signal indicates a vehicle speed is less than or equal to a first threshold speed, the blending function outputting the scheduled compensated torque command equal to the torque command signal when the vehicle speed signal indicates the vehicle speed is greater than or equal to a second threshold speed, the second threshold speed being greater than the first threshold speed, the blending function outputting the scheduled compensated torque command equal to a first value that is calculated utilizing the torque command signal, the compensated torque command signal, and a blend scheduling signal when the vehicle speed signal indicates the vehicle speed is greater than the first threshold speed and less than the second threshold speed.

18. The method of claim 17, wherein the blend scheduling signal is based on a look-up table responsive to the vehicle speed signal.

19. The method of claim 17, wherein the torque command signal is a based on the torque signal and is indicative of a desired assist torque for the steering system.

20. A storage medium encoded with a machine-readable computer program code, the code including instructions for causing a computer to implement a method for controlling an electric power steering system, the method comprising:

receiving a torque command signal;

receiving a vehicle speed signal responsive to a speed of a vehicle;

generating a compensated torque command signal utilizing a compensator function based on the torque command signal; and generating a scheduled compensated torque command for the electric motor utilizing a blending function, the blending function outputting the scheduled compensated torque command equal to the compensated torque command signal when the vehicle speed signal indicates a vehicle speed is less than or equal to a first threshold speed, the blending function outputting the scheduled compensated torque command equal to the torque command signal when the vehicle speed signal indicates the vehicle speed is greater than or equal to a second threshold speed, the second threshold speed being greater than the first threshold speed, the blending function outputting the scheduled compensated torque command equal to a first value that is calculated utilizing the torque command signal, the compensated torque command signal, and a blend scheduling signal when the vehicle speed signal indicates the vehicle speed is greater than the first threshold speed and less than the second threshold speed.

* * * * *